United States Patent [19]
Billing-Ross et al.

[11] Patent Number: 5,319,969
[45] Date of Patent: Jun. 14, 1994

[54] METHOD FOR DETERMINING 3-AXIS SPACECRAFT ATTITUDE

[75] Inventors: James A. Billing-Ross, Glendale, Ariz.; Douglas B. Pledger, Medford, Wis.

[73] Assignee: Honeywell Inc., Minneapolis, Minn.

[21] Appl. No.: 947,686

[22] Filed: Sep. 21, 1992

[51] Int. Cl.$^5$ .................... G01C 21/00; G01J 1/42
[52] U.S. Cl. .................... 73/178 R; 244/3.16; 250/206.1; 250/372; 364/459
[58] Field of Search ............ 73/178 R, 178 J, 178 H; 244/3.16, 3.18; 250/203.3, 203.6, 206.1, 206.2, 372; 364/459, 455, 443, 434

[56] References Cited

U.S. PATENT DOCUMENTS

| | | | |
|---|---|---|---|
| 3,641,347 | 2/1972 | Kubo et al. | 250/83.3 H |
| 3,657,549 | 4/1972 | Low et al. | 250/209 |
| 3,793,518 | 2/1974 | Harper | 250/83.3 H |
| 4,071,211 | 1/1978 | Muhlfelder et al. | 73/178 R |
| 4,328,421 | 5/1982 | Falbel | 250/347 |
| 4,628,206 | 12/1986 | Astheimer | 250/372 |
| 4,794,245 | 12/1988 | Auer | 250/203 R |
| 4,827,422 | 5/1989 | Savoca | 364/459 |
| 5,080,307 | 1/1992 | Smay et al. | 244/164 |
| 5,095,199 | 3/1992 | Selby | 250/206.2 |
| 5,107,434 | 4/1992 | Paluzek | 364/455 |
| 5,168,152 | 12/1992 | Kelley | 244/3.16 |
| 5,177,686 | 1/1993 | Böinghoff et al. | 364/459 |

*Primary Examiner*—Donald O. Woodiel
*Attorney, Agent, or Firm*—K. J. Johnson; D. E. Jepsen

[57] ABSTRACT

A three axis attitude orientation system for a spacecraft in orbit which employs a single UV sensor. The single sensor provides roll and pitch information by locating the centroid of the earth and using this as a reference point. The system determines yaw by tracking the position of stars which appear in the field of view around the earth. Three axis attitude is determined through ultraviolet imaging of the earth's limb and adjacent stars. A non-conventional wide angle optics assembly and intensified CCD array are utilized for this purpose.

8 Claims, 5 Drawing Sheets

Altitude Distribution of Ozone

Absorption Cross Sections of Ozone

METHOD FOR DETERMINING 3-AXIS SPACECRAFT ATTITUDE

FIELD OF THE INVENTION

This invention relates to spacecraft attitude determination, and more specifically to three-axis spacecraft attitude determination using a single ultraviolet light sensor.

BACKGROUND OF THE INVENTION

Satellites and spacecraft are used widely and can serve a variety of purposes. A satellite may be used for communication purposes between multiple positions on the earth which would not otherwise have a direct means of communication. A satellite or spacecraft may also be used for scientific purposes. the spacecraft may act as a platform for sensors which are either pointed at the earth or out into space.

In order to keep the sensors on a spacecraft pointed in the right direction or antennas pointed to the right place on the earth, an orientation system must be provided. In most cases, a three axis reference system must be used in order to provide the proper orientation. The spacecraft may then be stabilized through a variety of methods such as magnetic torquers, chemical thrusters, moment or reaction wheels, or any combination of three.

The orientation of the spacecraft may be determined by a variety of systems. One system provides an earth horizon sensor which scans the edges of the earth in the visible light range to provide pitch and roll orientation, while a separate sensor, which locates the sun at particular times of the day, provides yaw information. During the periods when the sun measurement is not available, the yaw is estimated. The horizon sensors may not provide accurate information of the pitch and roll because of atmospheric conditions on the earth.

Gyroscopes may be used in conjunction with the horizon sensors to provide yaw information. However, due to mechanical friction and other inefficiencies the gyroscopes must be periodically updated in order to provide accurate information. This may be done through a variety of star sensors and ephemeris information.

Another type of system uses an infrared sensor to scan the earth and locate the centroid. Around the centroid, the pitch and roll of the spacecraft can be determined. The limb of the earth can be scanned in the infrared range, as it provides a stable reference point for finding the centroid. The drawbacks of the infrared sensor are that its weight limits its applicability in many scenarios, its need for a cooling system, and its inability to provide three axis information. In most cases a gyroscope or an additional star must be used to provide yaw information.

It is an object of this invention to provide a three axis orientation system which is light weight and only requires a single sensor.

It is also an object of the invention to provide a method of providing three axis information for a spacecraft using an single ultraviolet sensor.

SUMMARY OF THE INVENTION

A three axis attitude detection system for a spacecraft in earth's orbit includes an ultraviolet light sensor assembly mounted on the spacecraft normal to the yaw axis. The sensor assembly is coupled to an optical assembly which focuses light from a wide field of view on the array. Included in the field of view of the optical assembly is the entirety of the earth's ultraviolet limb and at least one background star which appears around the edge of the earth's horizon.

A processor determines the rotation around the pitch and roll axis of the spacecraft by first centroiding the earth's limb and then comparing a measured centroid with a reference centroid. Rotation around the yaw axis of the spacecraft is determined by comparing the position of background stars with predicted locations of the stars from ephemeris information.

THE PREFERRED EMBODIMENT OF THE INVENTION

Figure 1:
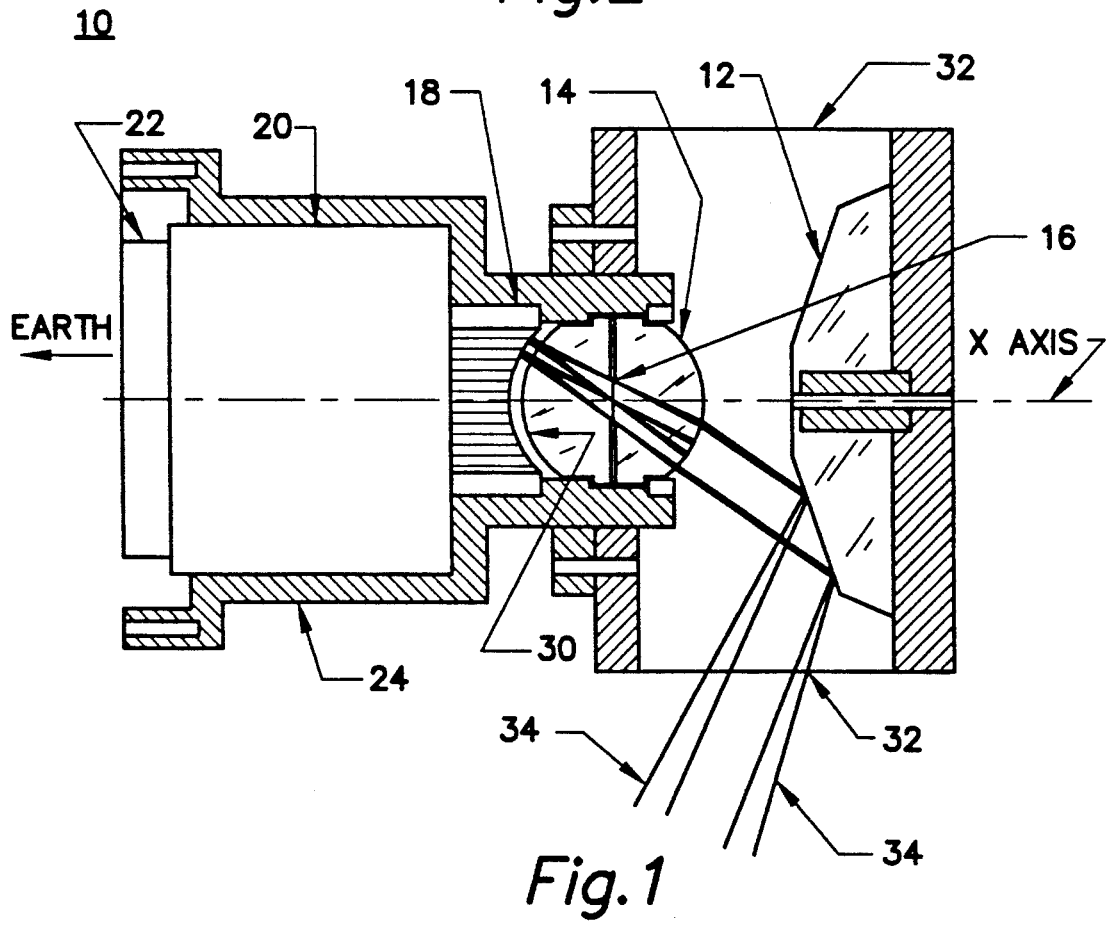
FIG. 1 is cross sectional view of the sensor assembly.

Shown in FIG. 1 is a cut away view of the sensor assembly 10. Included in the assembly 10 is the mirror assembly 12 which is positioned opposite the spherical lens 14. The spherical lens 14 has an aperture stop 16 which controls the amount of light allowed to pass through the lens to the fiber optic field flattener 18. The fiber optic field flattener 18 is shaped so as to match the petzval curvature of the ball lens. The fiber optic field flattener 18 is positioned adjacent to the spherical lens 14 along its image surface 30. The fiber optic field flattener is connected to the image intensifier 20, which in turn is connected to the mega pixel CCD array 22.

Figure 2:
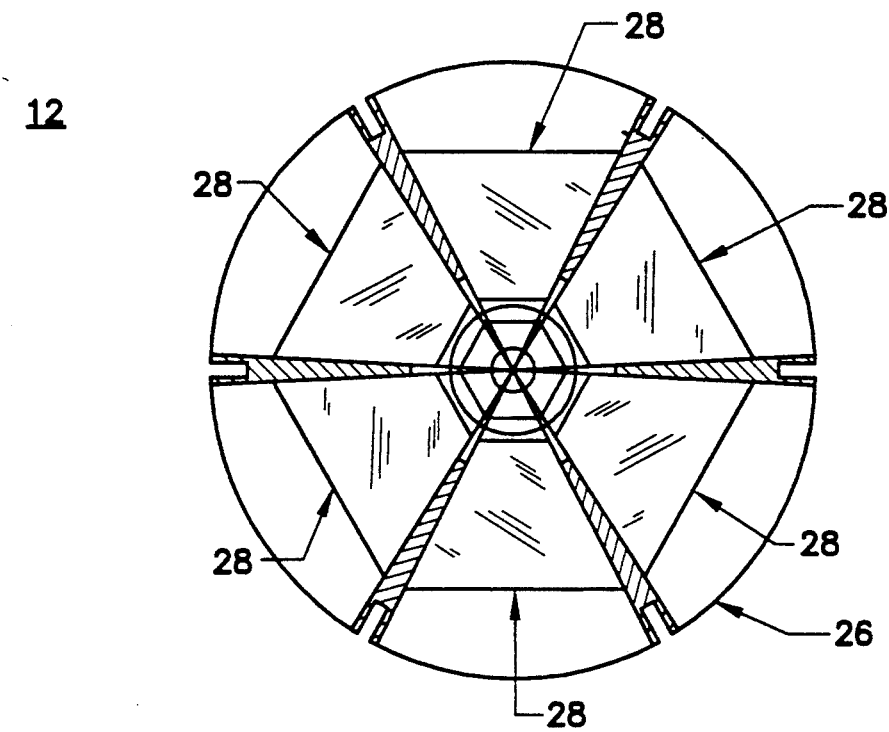
FIG. 2 is a planform view of the mirror assembly.

In FIG. 2 a planform view of the mirror assembly 12 is shown. The assembly includes six mirrors 28 laid out in a hexagonal shape. The mirrors 28 are attached to a support structure 26 which is mounted on the sensor housing 24 opposite the ball lens by spokes 32.

As seen in FIG. 1, when the sensor is part of an orbiting satellite, it is aligned so that the mirrors 28 reflect light from the earth into the ball lens. In an optimal situation, the satellite is positioned so that the X-axis points towards the earth, and the sensor housing 24 is between the mirrors 28 and the earth.

The purpose of the sensor assembly 10 is to provide three axis orientation or attitude information for an earth orbiting spacecraft. This information is necessary to provide an attitude correction system so that scientific instruments on the spacecraft may be oriented correctly, or antennas pointed in the proper direction. The present system operates by using a single ultra violet (UV) light sensor to provide all the necessary information.

One method of providing three axis orientation for a spacecraft is to use the earth as a reference to monitor movement about the pitch and roll axis. Remote objects, such as stars, are used to monitor movement around the yaw axis. The first step in this method is to find a reference point. This is done by scanning the earth and determining its centroid. Once the centroid is found, it can be used to detect any movements by the spacecraft around either the pitch or roll axis. Movement around the yaw axis is monitored by tracking the stars which appear around the background of the earth. Ephemeris information can be stored in a computer memory, and predicted locations of the stars can be compared with actual locations in order to determine the proper orientation of the spacecraft around the yaw axis.

Determining the centroid of the earth can be done in a variety of ways. A sensor which detects visible light can scan the entire horizon of the earth and calculate a center of area, or centroid. This method has a high degree of variability due to the fact that weather conditions may obscure the horizon, and clouds may reflect visible light which can obscure the readings. Also, the earth's horizon will not always be visible when the sun passes behind the earth. Another method is to scan for non-visible wavelengths of light, such as UV, which are present high above the earth's surface.

Figure 3:
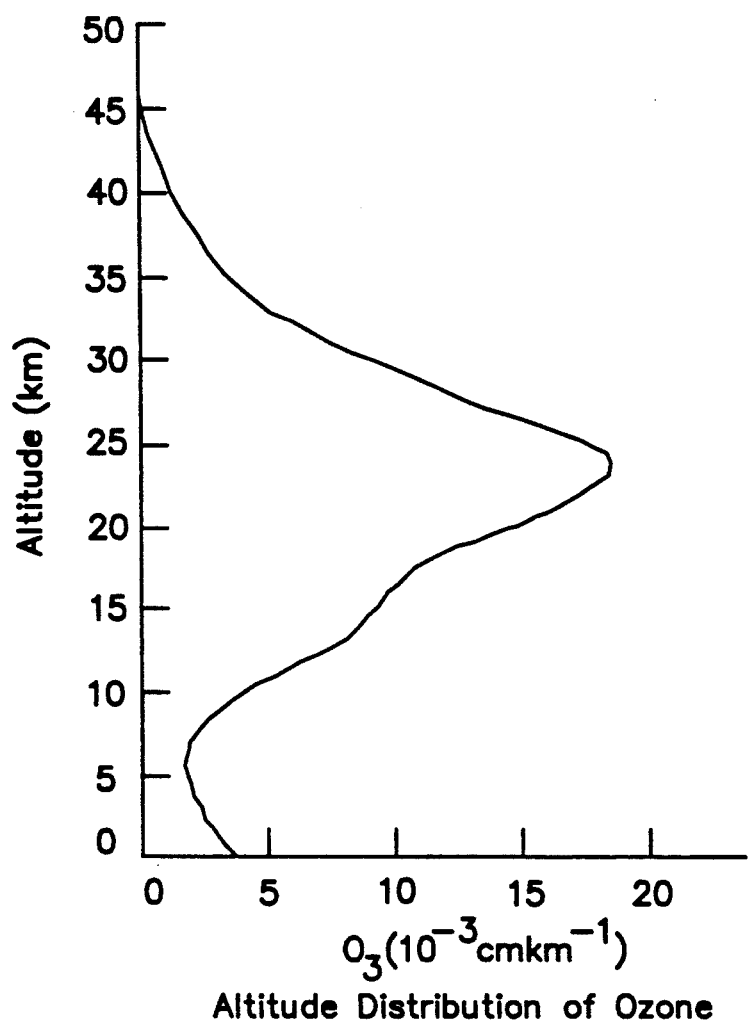
FIG. 3 is a graph of the altitude distribution of ozone
Figure 4:
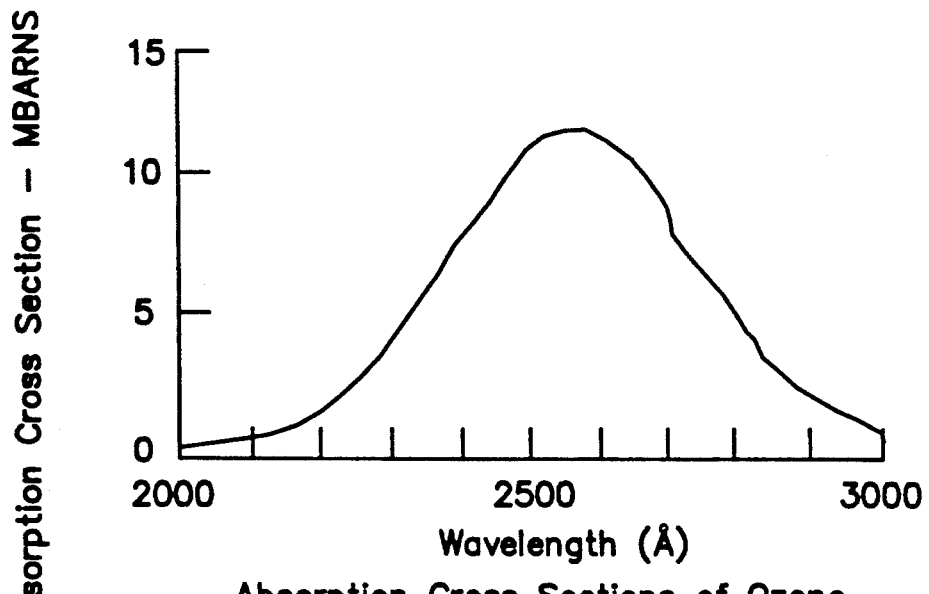
FIG. 4 is a graph of the absorption cross sections of ozone.
Figure 5:
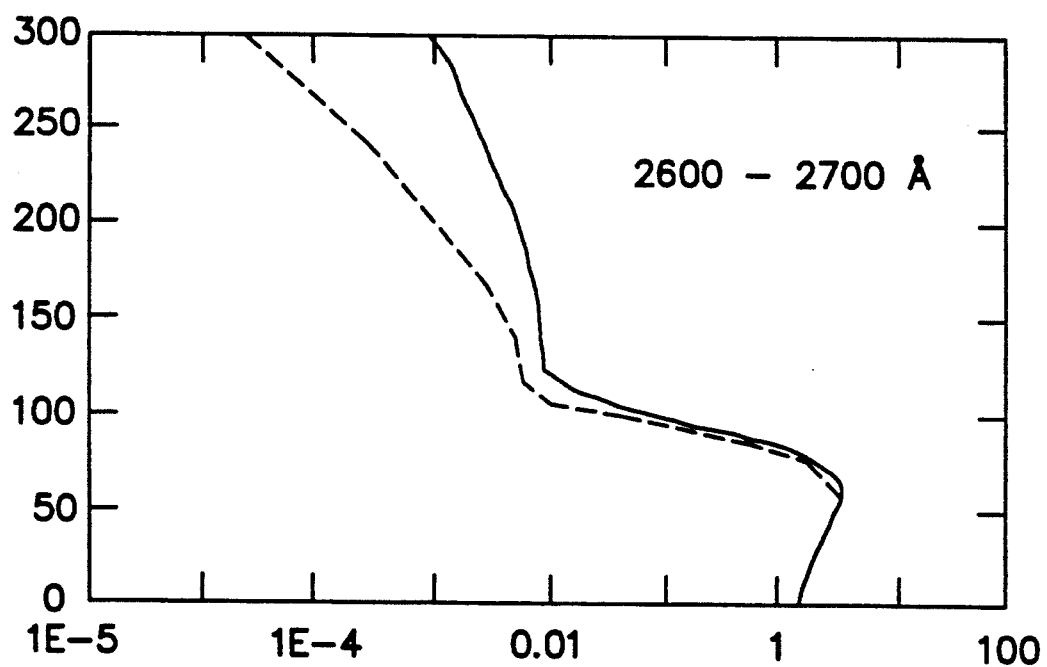
FIG. 5 is a graph of the limb intensity profile.

It is well known that ozone acts as a shield for the earth against different types of light such as UV. Ozone shows strong absorption characteristics at wavelengths below 3000 angstroms. UV light which is not absorbed by the ozone layer is scattered back into space. The ozone layer creates a distinct boundary in the earth's atmosphere between where UV light is present and where it is not. The sunlit limb, which occurs when the spacecraft is observing a sunlit earth, is a stable feature because it is formed at altitudes well above terrestrial features, and is consequently not affected by them. This can be seen from the altitude distribution and spectral absorption profiles of ozone as shown in FIGS. 3 and 4. Because the intensity profile is determined by Rayleigh scattering it is quite predictable, and depends entirely on the solar radiance and the altitude profiles of atmospheric constituents. The general appearance of the sunlit limb in the wavelength region of interest is seen in FIG. 5.

The night limb radiance, which occurs when the spacecraft and sun are on opposite sides of the earth, derives from emissions of atmospheric gases at higher altitudes, and has also been found to be well defined within the wavelength region of interest.

Sensor readings may be taken by observing the maximum intensity altitude of Rayleigh scattered sunlight during daylight conditions, and of the nightglow at night. These maxima occur at about 55 km and 91 km above hard earth respectively, and little if any variation in altitude has been observed. During the transition from day to night, or vice versa, a methodical progression in the location of the maximum between the two altitudes occurs.

The method herein disclosed is used in the Earth Reference Attitude Determination System (ERADS). ERADS determines roll, pitch, and yaw through observation of a number of terrestrial features and certain stars in a narrow band of the ultraviolet. Pitch and roll are derived from observing the maximum intensity altitude of Rayleigh scattered sunlight during daylight conditions, and of the nightglow at night. For this system to work, the entire earth limb is viewed, and the earth centroid determined from a mean center of the maximum intensity point at all azimuths. Because the entire earth is within the field of view, no alignment is necessary, and highly elliptic orbits can be accommodated with no adjustment. Any movement of a measured centroid from a reference centroid is translated into a pitch or roll rotation of the spacecraft.

Yaw can be determined by at least two methods. In the first method, yaw is determined from the location of one or more of a small catalog of stars with a significant ultraviolet output. Stars of the solar type or hotter of visible magnitude 4.5 or brighter can be seen by the ERADS sensor. This group includes at least 400 examples. The ERADS sensor views about 4% of the entire sky at one time, so the mean number of stars available at any time is 16. In all possible configurations, at least one star will be in the field of view.

In a second method, yaw can be determined from the sharp delineation of the day/night terminator in the ultraviolet region of the spectrum. The sunlit part of the earth appears relatively bright due to Rayleigh scattering of solar illumination in the upper regions of the atmosphere. The night side appears much fainter, but can still be observed through airglow, aurora, and upper atmospheric photochemical processes. The terminator, which separates these regions, is a well defined feature and its location on the earth is well known at any moment. It can be used to accurately determine the rotation about the yaw axis. When the terminator is visible, an expected terminator can be calculated by using the time from an epoch, the satellite ephemerals, and the sun ephemerals. This stored data can then be compared to the measured terminator to determine yaw. Due to orbital geometry, the terminator will not be available at all times, so star tracking must be used to provide continuous yaw monitoring.

Figure 6:
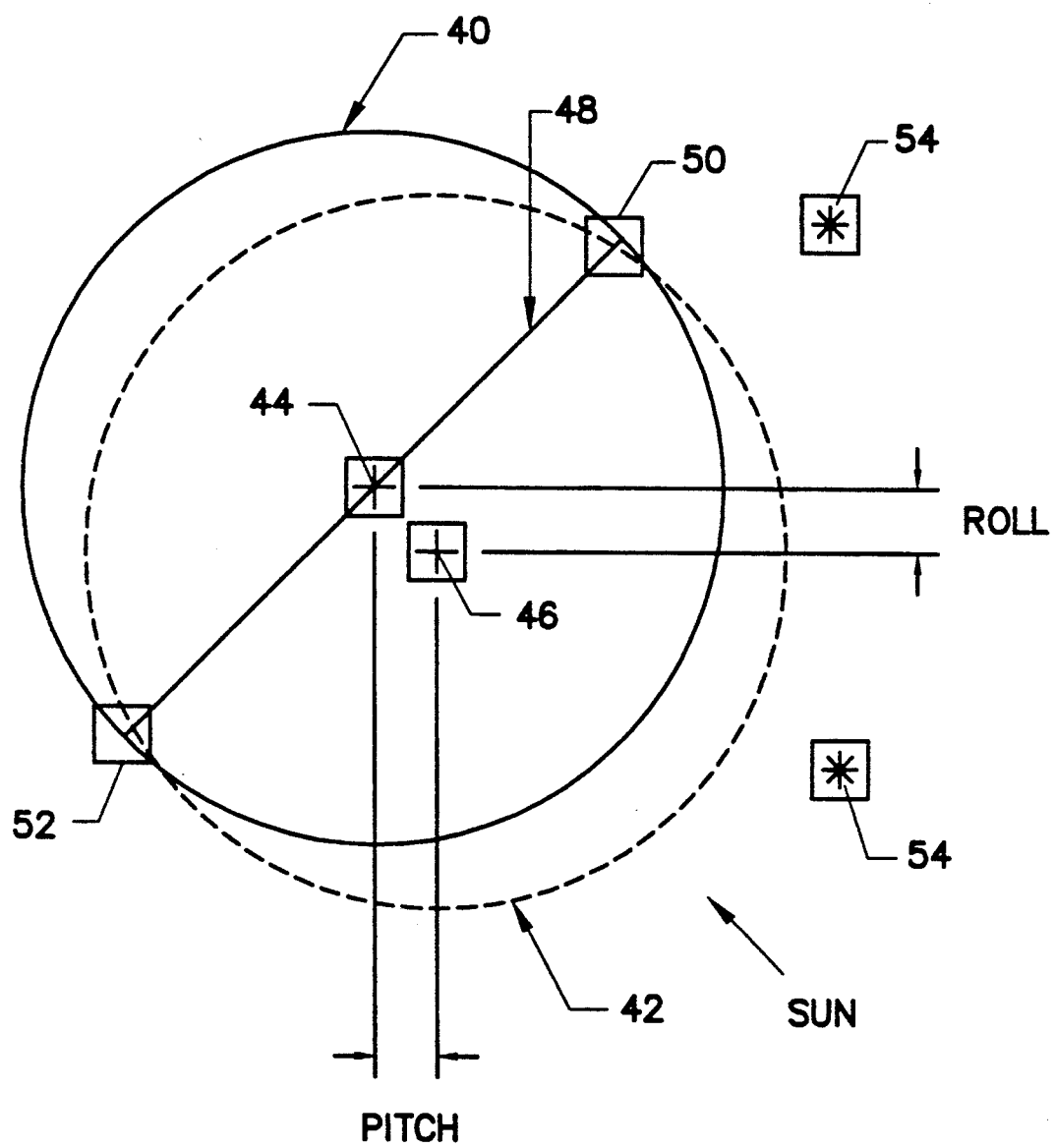
FIG. 6 is a diagrammatical illustration of the measured limb and centroid of the earth in comparison to a reference model

The above described method may be better understood by a study of the diagram in FIG. 6. Shown in the diagram in dashes is the reference limb 42 along with the reference centroid 46. Also shown is the measured limb 40 along with the measured centroid 44. Every time ERADS takes a reading it compares the position of the measured centroid 44 with the position of the reference centroid 46. The distance between the centroids can be translated into rotation of the spacecraft about the pitch or roll axis. Also shown is the measured terminator 48 along with terminator crossing no. 1 50 and terminator crossing no. 2 52. ERADS locates either of the terminator crossings and then compares them with predicted values from ephemeris information. The error between the measured and predicted terminator can be used to determine rotation of the spacecraft about the yaw axis. If the terminator is not available due to the time of day, ERADS may use the background stars 54 to determine yaw.

In operation, the ERADS sensor will view the region from the surface of the earth to 10 degrees above. In order to image these large angles, the combination of the mirror assembly 12, which acts as a reflective field reducer, and a spherical lens 14 is used. This combination can be seen in FIG. 1.

When an image is viewed, the light rays 34 are reflected off the mirrors 28 into the spherical lens 14. Because of the spherical shape of the lens the light is refracted towards the center of the lens. A center aperture stop 16 is used with lens which limits the amount of light which may pass through lens and ultimately improves the image quality. Because of the shape of the lens in relation to the stop, the only third order Seidel aberrations present are spherical aberration and Petzval curvature. Spherical aberration is minimized by using a sapphire lens, which has a very high refractive index. The curvature of the image surface 30 of the spherical lens 14 is matched to the Petzval curvature. This makes the lens more compact and useful over a wide field of view. By using the curved image surface, the beams which pass through the lens are at normal incidence to the image surface, which is favorable for illumination at the high field angles.

The curved surface of the fiber optic field flattener 18 is positioned adjacent to the curved image surface 30. The surface of the field flattener is coated with a medium for conversion transmission through the fiber bundle. The preferred range of ultraviolet light which works best with this system is between 2800 and 3000 angstroms. The image is then transmitted through the image intensifier 20 tube to the mega pixel CCD array 22. The CCD array converts the visible light image into a digitized electrical signal.

If the sensor were viewing the earth's limb without the mirror assembly 12, the total field of view could exceed 150 degrees. At this point the imaging qualities of the ball would be somewhat stressed. Because of the obliquity of the wavefront at the aperture stop 16, the effective aperture at extreme angles would be greatly reduced and there would be higher order aberrations present. Also, the mapping by the field flattener 18 of a nearly hemispherical image surface 30 to a flat one greatly increases the image footprint, especially at the edges of the image. Therefore, the mirror assembly 12 is used to map the extreme field into a more moderate field of view. The drawback of the mirror assembly is that many objects which are located at lower angles of incidence are not visible. Because ERADS only observes the outer edges of the earth this limitation does not hinder the system's overall performance.

Because of the wide field of view, no scanning or alignment of separate sensors will be required. Since the maximum intensity altitude of the limb is defined as the horizon, no absolute calibration is required.

As seen FIG. 2, six to eight mirrors 28 are positioned in a hexagonal or octagonal pattern rather than a continuous mirror. A continuous mirror would preserve mapping, but would introduce a great amount of astigmatism, which reduces resolution. The faceted mirrors 28 preserve wavefront quality, but introduce mapping distortion tangential to the limb. There are regions of ambiguity and missing data in the image at each mirror seam due to this mapping distortion. Because of the centroiding nature of the attitude determination and the total number of stars visible, this distortion is not detrimental to overall sensor performance.

Figure 7:
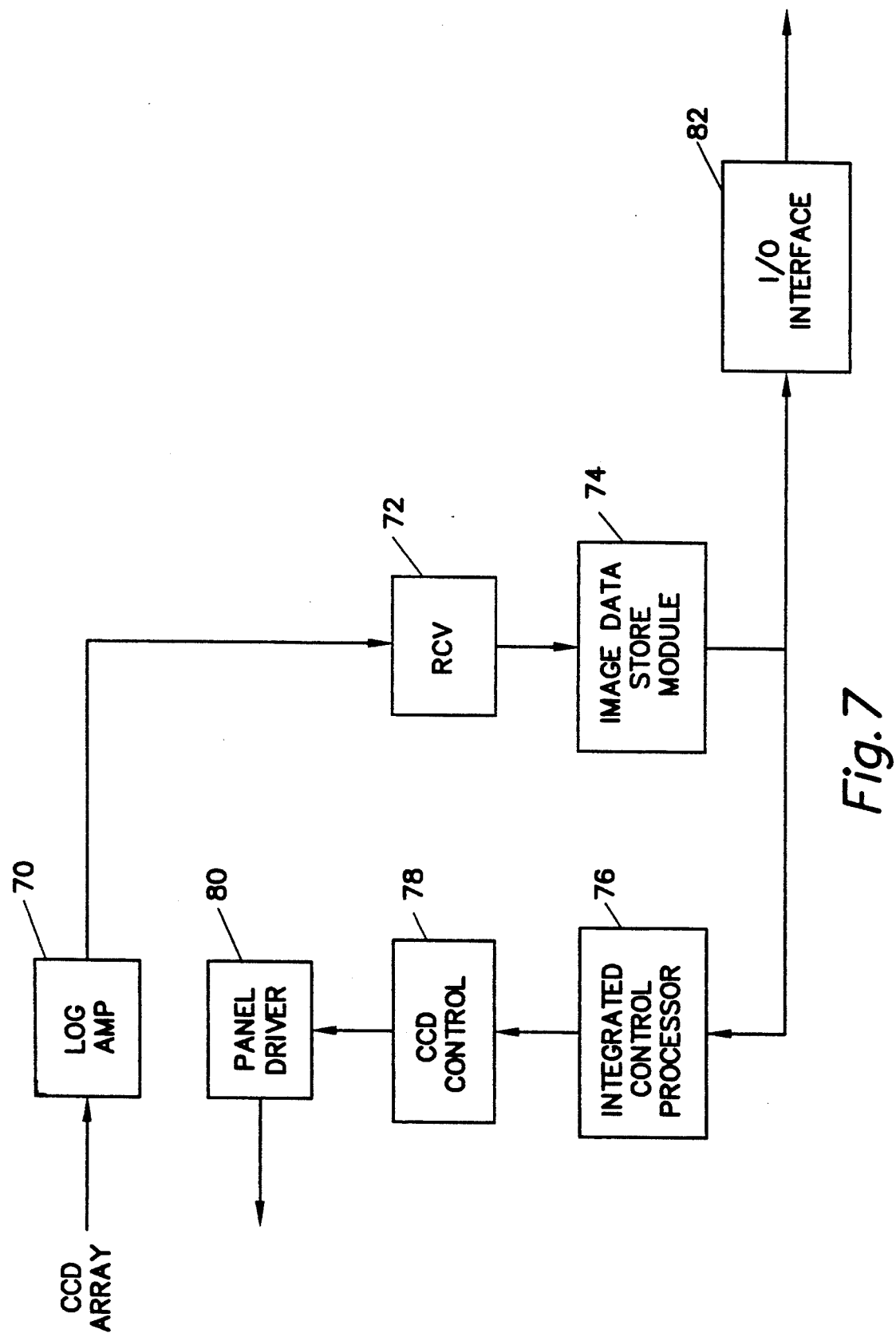
FIG. 7 is a block diagram of the sensor assembly processing system.

FIG. 7 discloses a block diagram of the information processing system for the ERADS. The processing system is comprised of components contained with the sensor assembly 10 which are electrically connected to the control electronics. The log amp 70 receives the image from the CCD array 22 and transmits it over a high speed data line to the control electronics. The digitized image is transmitted to the receiver 72 and then stored in memory in the Image Data Store Module (IDSM) 74. The IDSM 74 is connected to the Integrated Control Processor (ICP) 76 as well as to an input/output interface 82. This input/output interface 82 can be connected to a variety of functions which require information from the sensor. The ICP 76 is connected to CCD control 78 which in turn is connected to the panel driver. The panel driver 80 controls CCD array 22.

During operation of the sensor assembly 10, the ICP 76 sends a signal through the CCD control 78 for the CCD array 22 to receive an image. The CCD control 78 acts like a shutter control for a camera. The image from the CCD array 22 is then transmitted from the log amp 70 through the receiver 72 to the memory. The ICP 76 is signalled that the digitized image has been received in memory; it retrieves the image from memory and compares it with the stored data consisting of star charts and limb models to determine if the spacecraft is properly orientated. Star configurations are identified by position and magnitude at the time the image was received. The limb image received is compared to an onboard limb models. The ICP compares multiple vector measurements with reference vectors to provide a best estimate of the rotation from the reference frame to the measurement. This information is then output to spacecraft systems which require it. The image frames are processed at a nominal rate of 2 Hz, although this rate may be varied.

The foregoing is a description of a novel and nonobvious earth reference attitude detection system. The applicant does not intend to limit the invention through the foregoing description, but instead define the invention through the claims appended hereto.

We claim:

1. A method of determining three axis attitude information for a spacecraft in earth's orbit using a single ultraviolet light sensor assembly, comprising the steps of:

positioning the ultraviolet light sensor assembly on the spacecraft so as to view the entirety of the earth's ultraviolet limb and at least one background star;

establishing a reference centroid of the earth's ultraviolet limb using an image of the limb detected by the ultraviolet light sensor assembly;

determining rotation of the spacecraft about the pitch and roll axis of the spacecraft by monitoring the location of a measured centroid of the earth's ultraviolet limb in relation to the location of the reference centroid;

detecting an ultraviolet image of at least one of the background stars; and determining the rotation of the spacecraft about the yaw axis by monitoring the position of the ultraviolet image of the background stars in relation to the predicted locations of the background stars from ephemeris information.

2. The method of determining three axis attitude information of claim 1 wherein the steps of determining the location of the reference and measured centroids are accomplished by locating the mean center of points of maximum intensity at all azimuths of the limb.

3. The method of determining three axis attitude information of claim 1 wherein the step of determining the spacecraft rotation about the pitch and roll axis is accomplished by overlaying images of the measured centroids and the reference centroid in a reference plane and measuring the longitudinal and lateral distances between the measured and reference centroids.

4. The method of determining three axis attitude information of claim 1 wherein the step of determining the spacecraft rotation about the yaw axis is accomplished by overlaying the ultaviolet image of the background stars with an image of the predicted positions of said background in a reference plane and measuring the lateral and longitudinal distance between the ultraviolet image and the predicted position.

5. A method of determining three axis attitude information for a spacecraft in earth's orbit using a single ultraviolet light sensor assembly, comprising the steps of:

positioning the ultraviolet light sensor assembly on the spacecraft so as to view the entirety of the earth's ultraviolet limb and at least one background star;

establishing a reference centroid of the earth's ultraviolet limb using an image of the limb detected by the ultraviolet light sensor assembly;

determining rotation of the spacecraft about the pitch and roll axis of the spacecraft by monitoring the location of a measured centroid of the earth's ultraviolet limb in relation to the location of the reference centroid;

detecting an ultraviolet image of at least one of the background stars; and determining the rotation of the spacecraft about the yaw axis of the spacecraft by comparison of a measured location of a terminator crossing of the limb with the predicted location of the terminator crossing from ephemeris information.

6. The method of determining three axis attitude information of claim 5 wherein the steps of determining the location of the reference and measured centroids are accomplished by locating the mean center of points of maximum intensity at all azimuths of the limb.

7. The method of determining three axis attitude information of claim 5 wherein the step of determining the spacecraft rotation about the pitch and roll axis is accomplished by overlaying images of the measured centroids and the reference centroid in a reference plane and measuring the longitudinal and lateral distances between the measured and reference centroids.

8. The method of determining three axis attitude information of claim 5 wherein the step of determining the spacecraft rotation about the yaw axis is accomplished by overlaying an image of the measured position of the terminator crossing with the predicted positions of the terminator crossing in a reference plane and measuring the lateral and longitudinal distance between the ultraviolet image and the predicted position.

* * * * *